(12) United States Patent
Liu et al.

(10) Patent No.: US 6,673,132 B1
(45) Date of Patent: Jan. 6, 2004

(54) $SiO_2/Al_2O_3$ COMPOSITE ABRASIVE AND METHOD FOR PRODUCING THE SAME

(75) Inventors: Ru-Shi Liu, Hsin-Chu Hsien (TW); Sung-Chun Chang, Taipei (TW)

(73) Assignee: Everlight USA, Inc., Pineville, NC (US)

( * ) Notice: Subject to any disclaimer, the term of this patent is extended or adjusted under 35 U.S.C. 154(b) by 0 days.

(21) Appl. No.: 10/223,296

(22) Filed: Aug. 20, 2002

(51) Int. Cl.$^7$ .................................................. C09K 3/14
(52) U.S. Cl. ............................ 51/308; 51/307; 51/309; 51/295; 51/293
(58) Field of Search .......................... 51/307, 308, 309, 51/295, 293

(56) References Cited

U.S. PATENT DOCUMENTS 6,258,137 B1 * 7/2001 Garg et al. .................... 51/298
2002/0042210 A1 * 4/2002 Mandal et al. .............. 438/780

* cited by examiner

*Primary Examiner*—Michael Marcheschi
(74) *Attorney, Agent, or Firm*—Bacon & Thomas, PLLC

(57) ABSTRACT

An $SiO_2/Al_2O_3$ composite abrasive is disclosed, which has positive surface charges when dispersed in an alkaline water solution. This $SiO_2/Al_2O_3$ composite abrasive includes an $Al_2O_3$ core and $SiO_2$ coated thereon. The abrasive of the present invention is suitable for polishing metal, compact disks, optical lenses, and semiconductors etc in a high-pH environment. A method for producing the $SiO_2/Al_2O_3$ composite abrasive is also disclosed in the present invention.

14 Claims, 2 Drawing Sheets

$SiO_2/Al_2O_3$ COMPOSITE ABRASIVE AND METHOD FOR PRODUCING THE SAME

BACKGROUND OF THE INVENTION

1. Field of the Invention

The present invention relates to an abrasive for polishing and, more particularly, to an $SiO_2/Al_2O_3$ composite abrasive. The present invention also relates to a method for producing the composite abrasive.

2. Related Prior Art

As an important material for polishing, $Al_2O_3$ abrasives can be applied to the surface treatments of metal, glass, optical lens, compact disks etc. The $Al_2O_3$ abrasive usually provides high polishing rates to obtain a flat surface, however, the roughness increases as well. One way to solve such a problem is to modify the $Al_2O_3$ abrasive into a composite material by mixing with other materials. Additionally, for conventional $Al_2O_3$ abrasives, the polishing slurry has to be maintained at a low pH value, usually about 4, so that the $Al_2O_3$ abrasives can be well dispersed in water.

U.S. Pat. No. 6,261,476 mentioned a method to promote the polishing effect by simply blending abrasives of different sizes, which is adopted for chemical mechanical polishing (CMP) by most users now.

Mutsuo Sando, et al. mentioned another method in Funtai Kogaku Kaishi (1992, 29(10), 755–761), in which an $SiO_2$ layer is provided on an $\alpha$-$Al_2O_3$ abrasive surfaces. Unfortunately, the surface potential of this composite abrasive drops instantly when the pH value of the solution is higher than 5. That is, such composite material cannot be used in high-pH solutions.

Therefore, it is desirable to provide an improved polishing abrasive to mitigate and/or obviate the aforementioned problems.

SUMMARY OF THE INVENTION

An object of the present invention is to provide a modified $SiO_2/Al_2O_3$ composite abrasive, which has positive surface charges when dispersed in an alkaline solution.

Another object of the present invention is to provide a method for producing the modified $SiO_2/Al_2O_3$ composite abrasive.

The modified $SiO_2/Al_2O_3$ composite abrasive of the present invention can be used for polishing in an alkaline solution because of the positive surface charges, and exhibits good polishing rates because of the $Al_2O_3$ cores. The $SiO_2$ layer coated on the $Al_2O_3$ core usually has a thickness ranging from 1 nm to 100 nm.

The method for producing the $SiO_2/Al_2O_3$ composite abrasive of the present invention is to mix an $Al_2O_3$ abrasive and a precursory material in an alcohol. The mixture is then reacted with an acidic solution.

The precursor material aforementioned can be a silicide with an alkoxy group, for example, tetraethoxysilane. The alcohol can be $C_{1-4}$ alkyl alcohol, preferably isopropanol. The acidic solution can be inorganic, for example, sulfuric acid and hydrochloric acid; or organic, for example, acetic acid.

Other objects, advantages, and novel features of the invention will become more apparent from the following detailed description when taken in conjunction with the accompanying drawings.

BRIEF DESCRIPTION OF THE INVENTION

Figure 3:
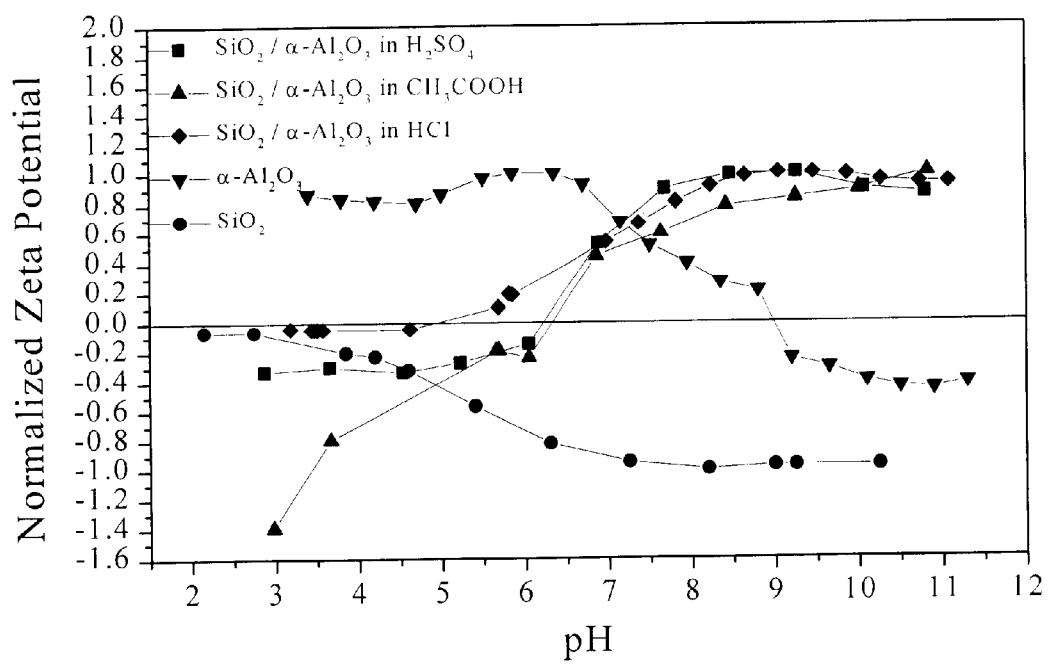

FIG. 3 shows the zeta potential changing with pH values of (A) unmodified $\alpha$-$Al_2O_3$, (B) unmodified $SiO_2$, (C) the modified $\alpha$-$Al_2O_3$ by coating with $SiO_2$ (obtained from Example 1; $SiO_2/\alpha$-$Al_2O_3$ in $HCl_{(aq)}$), (D) the modified $\alpha$-$Al_2O_3$ by coating with $SiO_2$ (obtained from Example 2; $SiO_2/\alpha$-$Al_2O_3$ in $H_2SO_{4(aq)}$) and (E) the modified $\alpha$-$Al_2O_3$ by coating with $SiO_2$ (obtained from Example 3; $SiO_2/\alpha$-$Al_2O_3$ in $HAc_{(aq)}$).

DETAILED DESCRIPTION OF THE INVENTION

The method for producing the $SiO_2/Al_2O_3$ composite abrasive of the present invention is by mixing an $Al_2O_3$ abrasive and a precursory material in alcohol. The mixture is then reacted with an acidic solution, so that the $SiO_2$ can combine with the $Al_2O_3$ abrasive and further form a uniform and stable coating layer. The modified $SiO_2/Al_2O_3$ composite abrasive can be used for polishing in an alkaline solution because of the positive surface charges, and exhibits good polishing rates because of the $Al_2O_3$ core.

The $Al_2O_3$ abrasive used in the present invention is not restricted, for example, $\alpha$-$Al_2O_3$, $\gamma$-$Al_2O_3$, $\theta$-$Al_2O_3$ and mixtures thereof can be used, wherein the $\alpha$-$Al_2O_3$ is most common. The precursor material is not restricted but must be suitable for polishing, for example, suicides with alkoxy groups. Tetraethoxysilane (TEOS; $Si(OCH_2CH_3)_4$) is one of such suicides, wherein the alkoxy group (—$OCH_2CH_3$) can be substituted with the hydroxyl group (—OH) of water and form $Si(OH)_4$ which is then transformed into $SiO_2$ by dehydration.

The alcohol used in the present invention has less carbon atoms, for example, methanol, ethanol, propanol, isopropanol, butanol and isobutanol, wherein isopropanol is preferred.

The acidic solution can be inorganic or organic, for example, sulfuric acid, hydrochloric acid and acetic acid, wherein hydrochloric acid is preferred.

Figure 1:
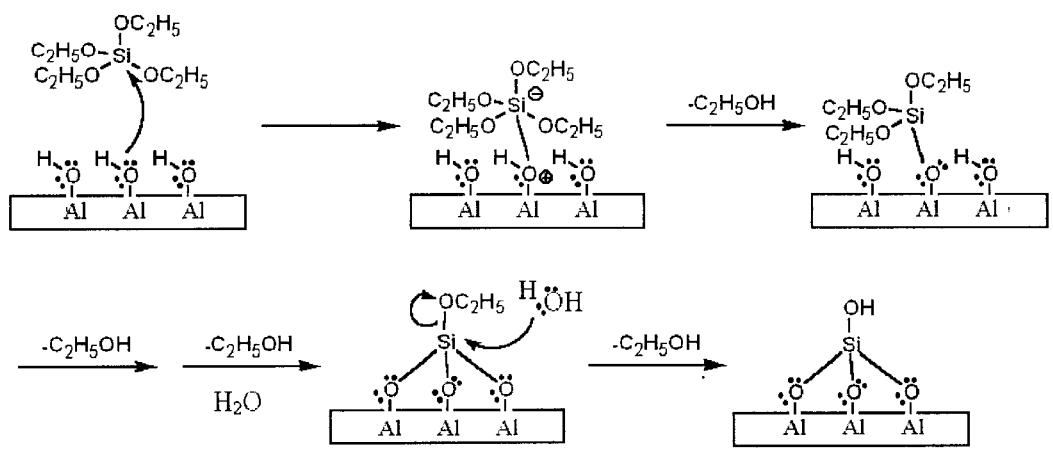
FIG. 1 shows the reaction of producing the modified $SiO_2/Al_2O_3$ composite abrasive.
Figure 2:
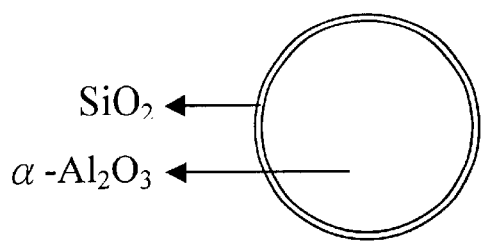
FIG. 2 shows the structure of the modified $SiO_2/Al_2O_3$ composite abrasive in accordance with the present invention.

FIG. 1 shows the reaction of producing the modified $SiO_2/Al_2O_3$ composite abrasive, in which the $\alpha$-$Al_2O_3$ abrasive has hydroxyl groups thereon when contacting with $H_2O$ existing in, for example, air. The hydroxyl groups can react with the silicide alkoxyl groups, for example, tetraethoxysilane (TEOS), to remove the alkoxy groups under existence of alcohol and acid. The oxygen of the hydroxyl group is then associated with the Si in the silicide to form a modified $SiO_2/Al_2O_3$ abrasive with Al—O—Si covalent bonding. Such bonding is strong enough to form an $SiO_2$ coating layer under a nano-scale regime, generally 10–20 nm, as shown in FIG. 2.

The following examples are used to illustrate the present invention but not limited to the scope thereof. In these Examples, the parts and percentages are based on weight unless being particularly indicated.

EXAMPLE 1

$SiO_2/\alpha$-$Al_2O_3$ in $HCl_{(aq)}$ $\alpha$-$Al_2O_3$ (1 mol, 101.96 g) and isopropanol (4 mol, 240.40 g) are mixed and placed in an ultrasonic vibration mixer for 5 minutes. Tetraethoxysilane (1 mol, 208.09 g) is then added into the mixture dropwise with blending for 30 minutes. A hydrochloric acid solution containing HCl (0.18 mol, 6.57 g) and water (4 mol, 72 g) is added dropwise into the above mixture and the reaction is carried out with blending for 2 hours. After the reaction is completed, precipitate is filtered and dried to obtain the $SiO_2/\alpha$-$Al_2O_3$ abrasives (about 100 g). Under TEM (Hitachi H-7100), the $Al_2O_3$ abrasive with a $SiO_2$ coating layer of about 10 nm thickness can be observed.

EXAMPLE 2

$SiO_2/\alpha$-$Al_2O_3$ in $H_2SO_{4(aq)}$

Repeat steps of Example 1, but replace the hydrochloric acid solution with sulfuric acid solution containing sulfuric acid (0.18 mol, 17.64 g) and water (4 mol, 72 g). After the reaction is completed, the precipitate is filtered and dried to obtain the $SiO_2/\alpha$-$Al_2O_3$ abrasives (about 100 g).

EXAMPLE 3

$SiO_2/\alpha$-$Al_2O_3$ in $HAc_{(aq)}$

Repeat steps of Example 1, but replace the hydrochloric acid solution with acetic acid solution containing acetic acid (0.18 mol, 10.8 g) and water (4 mol, 72 g). After the reaction is completed, precipitate is filtered and dried to obtain the $SiO_2/\alpha$-$Al_2O_3$ abrasives (about 100 g).

TEST EXAMPLE

Zeta Potential of the Abrasives vs. pH Values

Prepare five solutions respectively containing 5 wt. % of the following materials:

(A) unmodified $\alpha$-$Al_2O_3$;
(B) unmodified $SiO_2$;
(C) the modified $\alpha$-$Al_2O_3$ coated with $SiO_2$ (obtained from Example 1; $SiO_2/\alpha$-$Al_2O_3$ in $HCl_{(aq)}$);
(D) the modified $\alpha$-$Al_2O_3$ coated with $SiO_2$ (obtained from Example 2; $SiO_2/\alpha$-$Al_2O_3$ in $H_2SO_{4(aq)}$); and
(E) the modified $\alpha$-$Al_2O_3$ coated with $SiO_2$ (obtained from Example 3; $SiO_2/\alpha$-$Al_2O_3$ in $HAc_{(aq)}$); and then shake these solutions in an ultrasonic vibration mixer over 15 minutes. Change the pH values of these solutions from 3.5 to 11.5 by adding $HNO_3$ and KOH, and measure zeta potentials thereof.

As shown in FIG. 3, zeta potentials of the solutions (C)–(E) containing the modified $SiO_2/\alpha$-$Al_2O_3$ can be kept positive when pH values are higher than 7. The zeta potentials also increase with pH values when the pH value is lower than 9, and become negative between pH 3.5 and pH 6, regardless if organic or inorganic acids are added.

As for the solutions (A) and (B) containing unmodified $\alpha$-$Al_2O_3$, the zeta potentials are positive between pH 3.5 and pH 9.0, and negative when the pH value is higher than 9.0.

According to the test results, the $SiO_2/Al_2O_3$ abrasive of the present invention is actually different from conventional abrasives.

In order to uniformly disperse the unmodified $Al_2O_3$ abrasive in water solution by repulsion, the water solution has to be acidic to maintain the conventional abrasive at high surface potential. However, the polished metal will be simultaneously corroded under such an acidic environment.

The surface property of the abrasive modified according to the present invention is similar to $SiO_2$ when the pH value is lower than 5, and the surface potential may increase with the pH value when the pH value is higher than 5. As a result, the modified abrasive can be widely applied to many fields, for example, polishing metal, optical lens, compacted disks, semiconductors, etc.

Although the present invention has been explained in relation to its preferred embodiment, it is to be understood that many other possible modifications and variations can be made without departing from the spirit and scope of the invention as hereinafter claimed.

What is claimed is:

1. A method for producing an $SiO_2/Al_2O_3$ composite abrasive, said $SiO_2/Al_2O_3$ composite abrasive having positive surface charges when dispersed in an alkaline water solution; and said method comprising mixing an $Al_2O_3$ abrasive and a $SiO_2$ precursory material in alcohol to form a mixture; and then reacting said mixture with an acidic solution.

2. The method as claimed in claim 1, wherein said precursory material is a silicide with an alkoxy group.

3. The method as claimed in claims 2, wherein said silicide with an alkoxy group is tetraethoxysilane.

4. The method as claimed in claim 1, wherein said alcohol is $C_{1-4}$ alkyl alcohol.

5. The method as claimed in claim 1, wherein said alcohol is isopropanol.

6. The method as claimed in claim 1, wherein said acidic solution is an inorganic acidic solution.

7. The method as claimed in claim 6, wherein said inorganic acidic solution is sulfuric acid or hydrochloric acid solution.

8. The method as claimed in claim 1, wherein said acidic solution is an organic acidic solution.

9. The method as claimed in claim 8, wherein said organic acidic solution is acetic acid solution.

10. The method as claimed in claim 1, wherein said $SiO_2/Al_2O_3$ composite abrasive is an $Al_2O_3$ abrasive coated with $SiO_2$.

11. The method as claimed in claim 10, wherein said $SiO_2$ has a thickness ranging from about 1 nm to about 100 nm.

12. The method of claim 1, wherein the $SiO_2/Al_2O_3$ composite abrasive has a spherical shape.

13. The method of claim 10, wherein the $SiO_2/Al_2O_3$ composite abrasive has a spherical shape.

14. The method of claim 11, wherein the $SiO_2/Al_2O_3$ composite abrasive has a spherical shape.

* * * * *